Nov. 15, 1927.
A. C. SPENCER
1,648,967
PROCESS FOR CONTINUOUSLY CRACKING AND FRACTIONATING HYDROCARBONS
Filed July 3, 1923
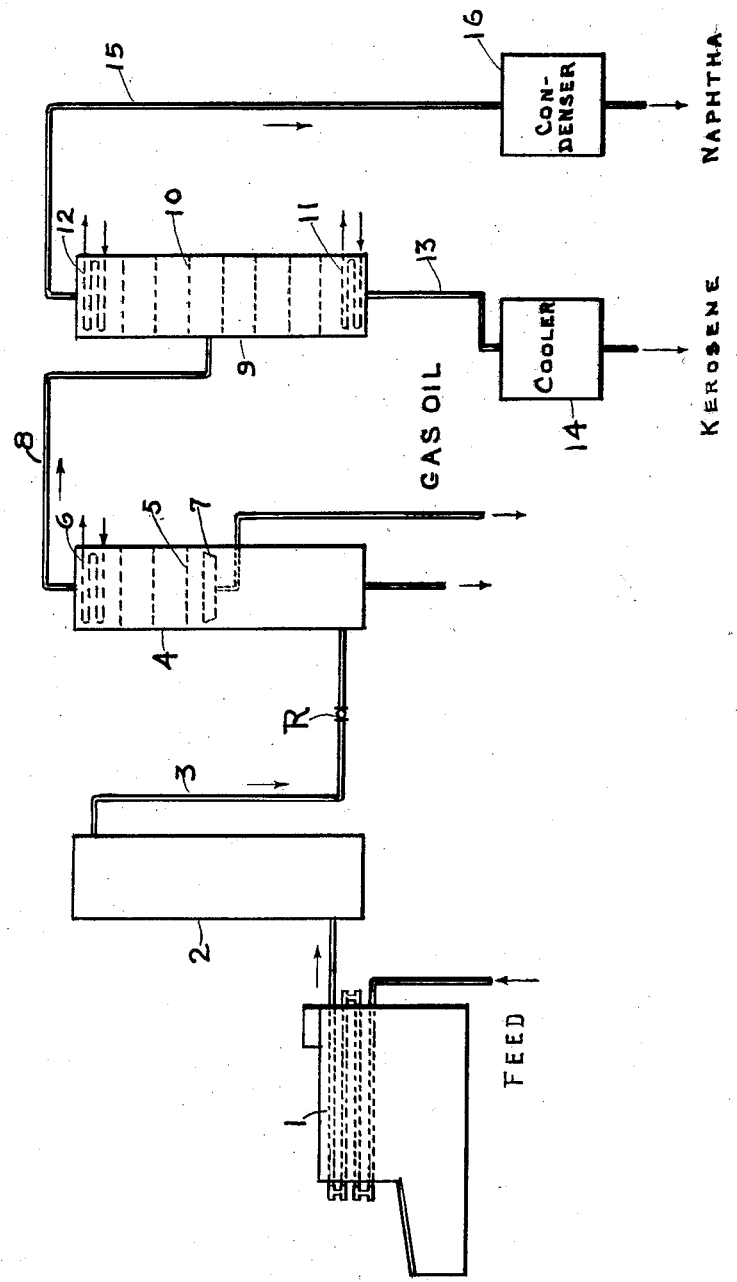
Inventor
Alexander C. Spencer
By  Q G Messenger
Attorney Patented Nov. 15, 1927.

1,648,967

UNITED STATES PATENT OFFICE.

ALEXANDER C. SPENCER, OF SARNIA, ONTARIO, CANADA, ASSIGNOR TO STANDARD DEVELOPMENT COMPANY, A CORPORATION OF DELAWARE.

PROCESS FOR CONTINUOUSLY CRACKING AND FRACTIONATING HYDROCARBONS.

Application filed July 3, 1923. Serial No. 649,328.

This invention relates to the art of fractionating hydrocarbon mixtures, and will be fully understood from the following description, taken in connection with the accompanying drawing which represents diagrammatically a form of apparatus contemplated in the invention.

In the drawing, the reference character 1 designates a heated conduit or passageway of suitable construction, for example a bank of tubes connected at the ends by cross-over connections from tube to tube and row to row to allow flow of fluid in a consecutive path and arranged in relation to a furnace or other heating means. Connected to the heated conduit is a further passageway 2 guarded against material loss of heat. This may be for example in the form of a drum, covered with insulation or mounted in the path of products of combustion as desired. From the passageway 2 a connection 3 leads to a vapor separator and fractionating tower 4, the fractionating tower portion having rectifying plates 5, a valve-controlled cooling coil 6 and a collecting pan 7 for collecting heavy condensate. A pressure release valve R may be located in the connection 3 to enable maintenance of pressure in the zones 1 and 2 when so desired. A vapor connection 8 leads from the top of tower 4 to discharge, preferably along in the middle region of a fractionating tower 9 having suitable rectifying plates 10, a valve-controlled heating coil 11 in the bottom and a valve-controlled cooling coil 12 at the top. From the bottom a pipe 13 leads off, through a cooler 14, to a tank (not shown), and from the top a vapor connection 15 leads to a final condenser 16 and a tank (not shown).

In operation, products from the passageways 1, 2, which ordinarily are operated as a cracking apparatus, enter the vapor separator and vapors rising pass up through the rectifying plates 5, a controlled reflux being provided by the regulable cooler 6. Heavy condensate, for example corresponding to gas oil, is collected by pan 7 and passed on through the discharge pipe for disposition as desired. The vapors escaping by pipe 8 are further separated in the next tower, and a condensate, for example a kerosene, may be drawn off by pipe 13, while the final vapors pass on over by pipe 15 to the condenser 16 for gasoline. In such manner a final separation into commercial fractions may be made directly, thereby avoiding the re-running of distillates as has been the practice heretofore.

According as may be preferred, a large part of the cracking may be accomplished in the conduit 1, the process being finished up in the passageway 2, or the conduit may be used merely to bring the oil up to temperature, the cracking being accomplished in the passageway 2; and in the broader aspects of my invention irrespective of cracking I contemplate passing hot hydrocarbons into a fractionating tower providing progressively cooler zones having a controlled reflux, and thereby eliminating constituents other than kerosene and gasoline vapors, and then introducing these vapors into a further fractionating tower having progressively cooled zones and a controlled reflux to effect a final separation, the kerosene fraction being taken off as condensate at the bottom of this tower, and the gasoline vapors being passed on from the top to a gasoline condenser.

What I claim is:

1. A process of the character described, which comprises continuously subjecting a stream of hydrocarbons to a cracking temperature, separating out fractions heavier than kerosene in a series of progressively cooler zones provided with a controlled reflux, then fractionally separating remaining vapors into kerosene and gasoline by feeding the vapors about midway in a second series of progressively cooled zones provided with a controlled reflux.

2. A process of the character described, which comprises continuously subjecting a stream of hydrocarbons to heat, allowing vaporization to occur, condensing out a fraction from the vapors heavier than kerosene, then fractionally separating the remaining vapors into kerosene and gasoline by introducing the vapors about midway in a series of progressively cooled zones provided with a controlled reflux.

ALEXANDER C. SPENCER.